United States Patent [19]

Abrams

[11] Patent Number: 4,783,056
[45] Date of Patent: Nov. 8, 1988

[54] PROCESS FOR MAKING AN ASEPTIC VIAL AND CAP

[76] Inventor: Robert S. Abrams, 21 Marion Ave., Albany, N.Y. 12203

[21] Appl. No.: 928,475

[22] Filed: Nov. 10, 1986

[51] Int. Cl.⁴ .............................................. B29C 45/04
[52] U.S. Cl. .................................. 264/40.5; 264/40.1; 264/328.1; 264/328.16; 264/238
[58] Field of Search ................... 264/40.1, 328.1, 238, 264/248, 525, 40.5, 328.16; 53/167, 426, 561; 215/1 C, 32; 156/69; 220/306

[56] References Cited

U.S. PATENT DOCUMENTS

| | | | |
|---|---|---|---|
| 2,991,500 | 7/1961 | Hagen | 18/5 |
| 3,537,676 | 11/1970 | Miller | 425/468 |
| 3,730,372 | 5/1973 | Komendowski | 215/32 |
| 3,804,282 | 4/1974 | Komendowski | 215/32 |
| 4,134,511 | 1/1979 | Deussen | 215/32 |
| 4,176,755 | 12/1979 | Winchell | 215/32 |
| 4,340,352 | 7/1982 | Hayberg | 425/517 |
| 4,351,630 | 9/1982 | Hayberg et al. | 425/517 |

Primary Examiner—Jan H. Silbaugh
Assistant Examiner—Allan R. Kuhns
Attorney, Agent, or Firm—Burns, Doane, Swecker & Mathis

[57] ABSTRACT

A mold for forming the vial and cap and for seating the cap on the vial prior to ejecting the vial from the mold is provided and includes a frame for the mold, a first mold half arranged on the frame, and a second mold half movable arranged relative to the first mold half so as to form a mold cavity therebetween. The mold produces a vial and cap including smooth radii provided at several locations to facilitate the seating of the cap on the vial.

12 Claims, 3 Drawing Sheets

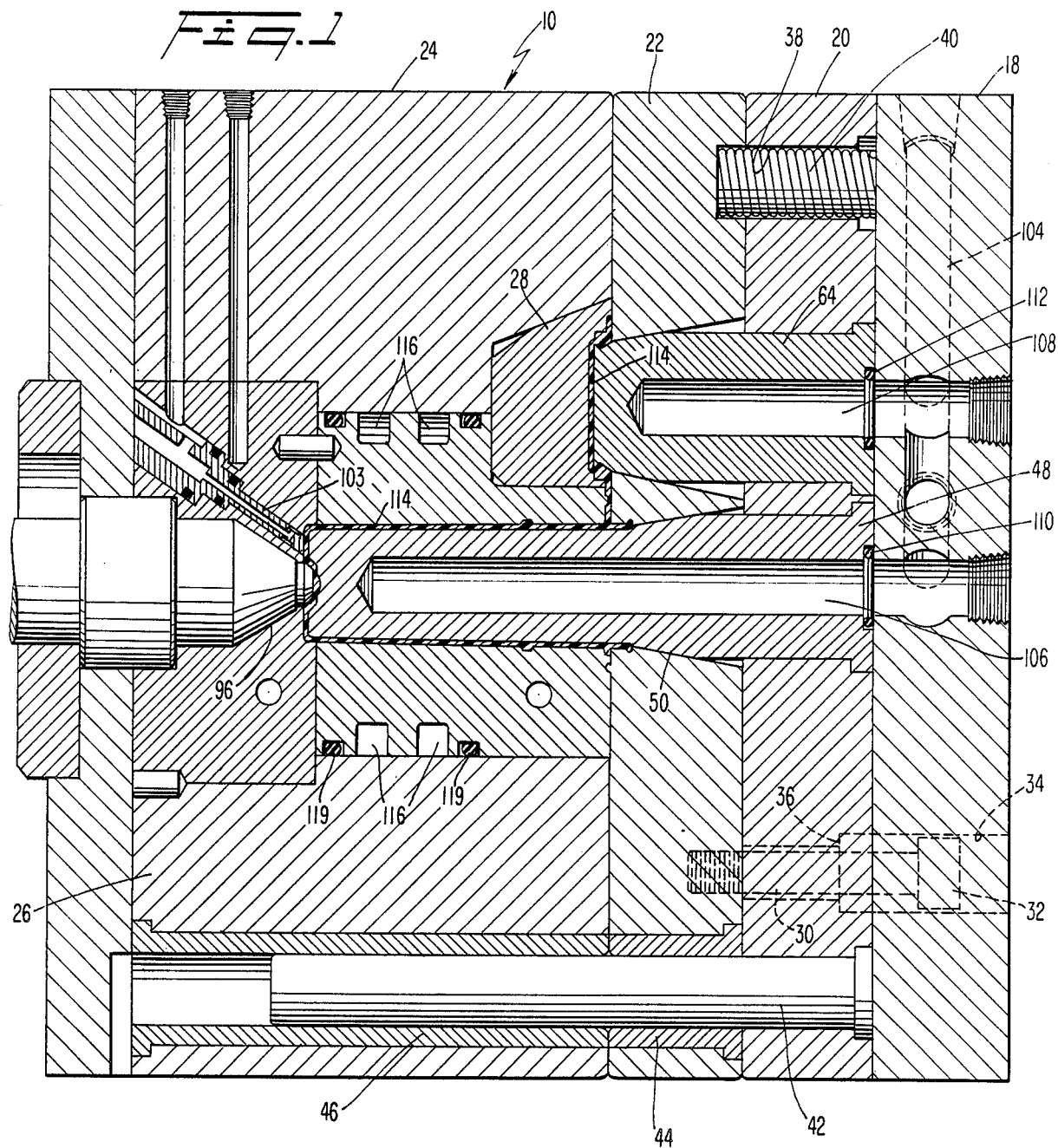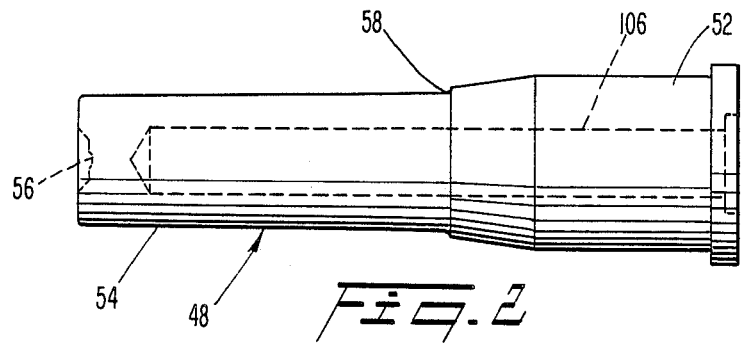

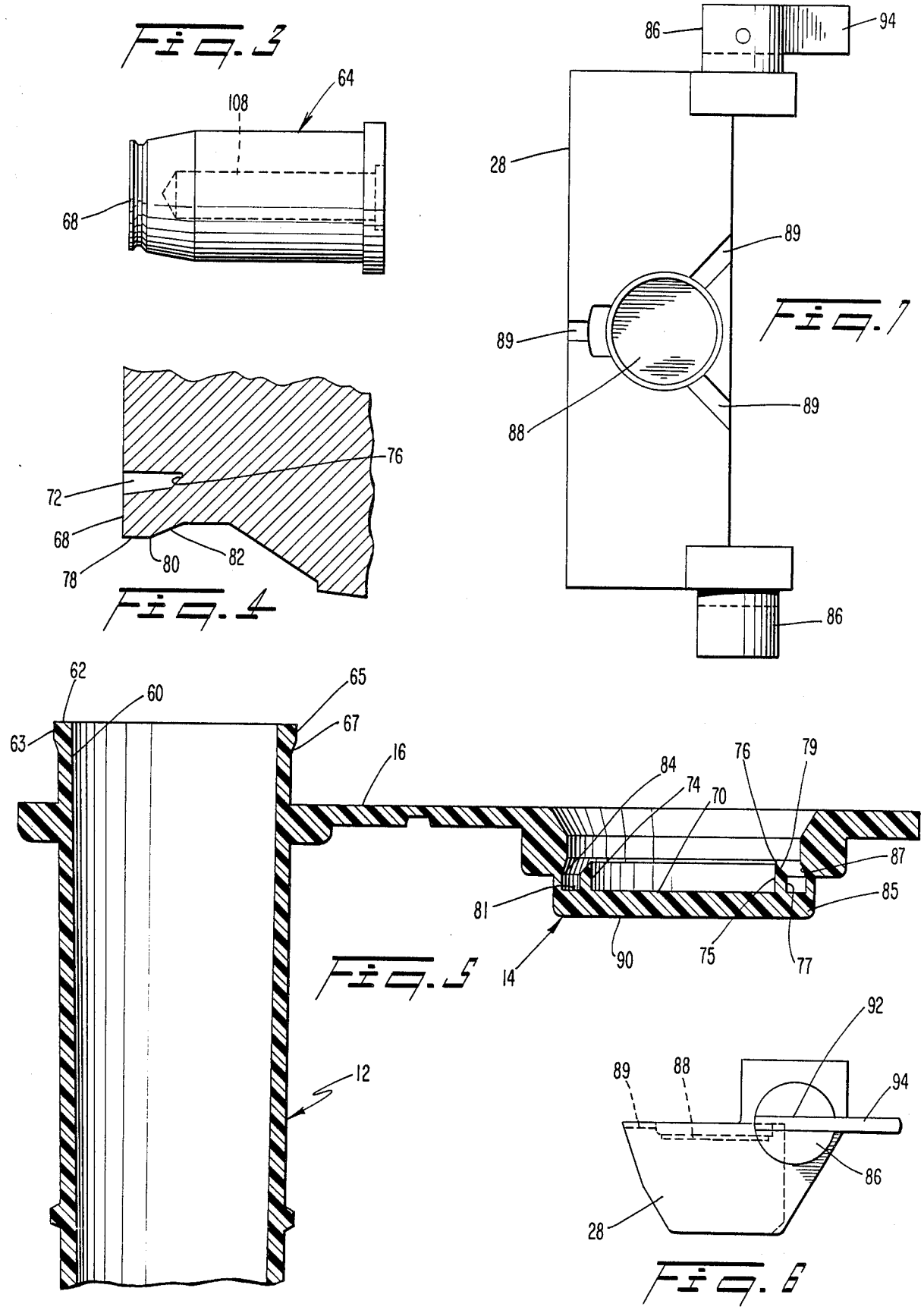

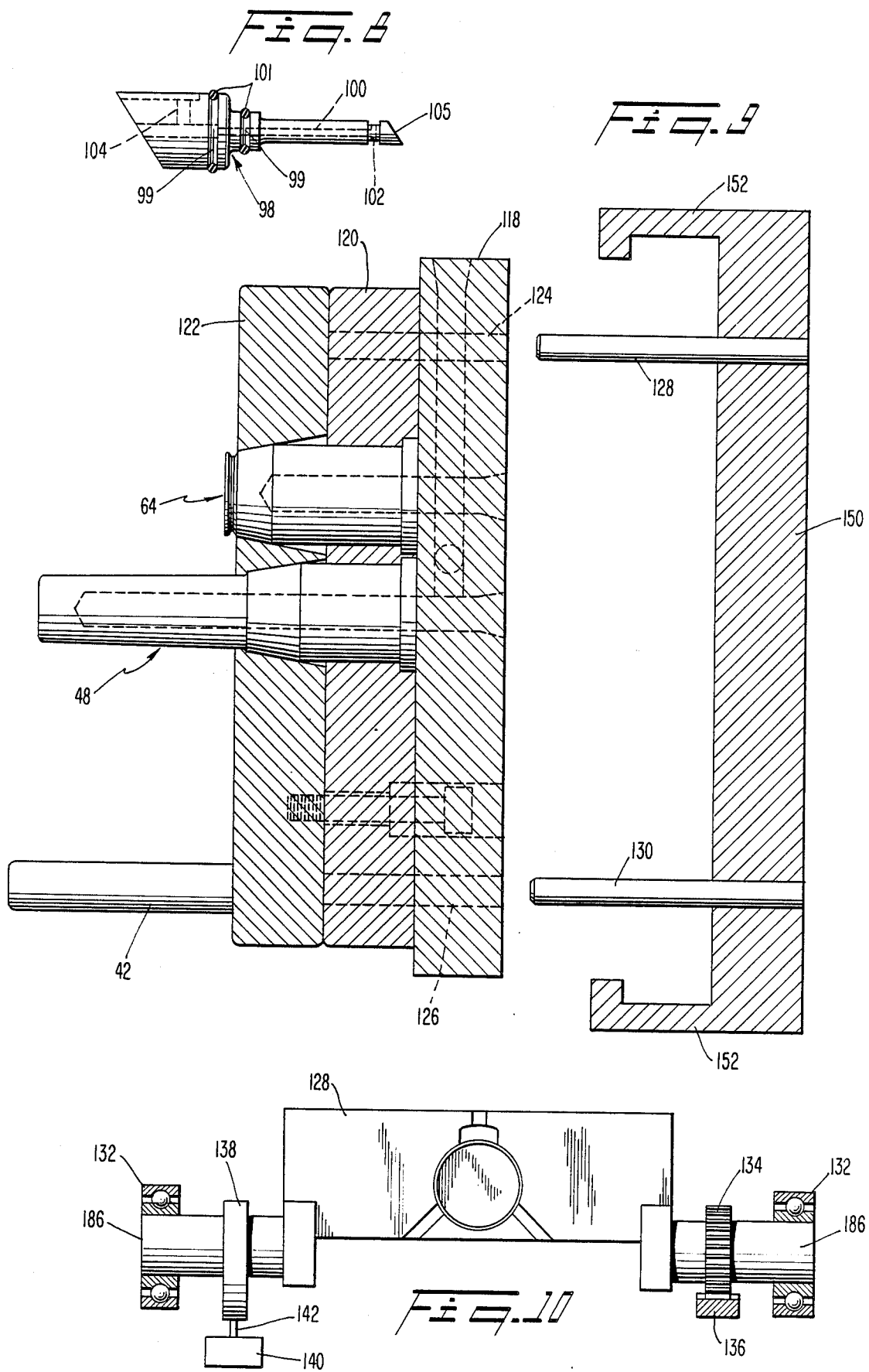

PROCESS FOR MAKING AN ASEPTIC VIAL AND CAP

BACKGROUND AND SUMMARY OF THE INVENTION

The present invention relates to a sealable vial and a mold and a process for making the vial in the mold. More particularly, the present invention relates to a sealable vial and cap and mold therefor, wherein the vial is sealed closed within the mold.

Vials of the type to which the present invention relates are generally injection-molded plastic vials that have caps adapted to seal the vial closed with a substantially hermetic seal. The cap may or may not be integrally connected to the vial, but is preferably joined thereto with a small flange. It is important to maintain the sterility of the interior of the vial prior to use. Accordingly, in order to maintain the sterility of the interior of the vial the cap must be closed onto the vial while the vial is in an aseptic environment.

The vial itself is preferably formed from a thermoplastic material, and is essentially cylindrical in shape, with an integrally formed bottom. Such vials are used to collect samples, e.g., in the dairy industry. The caps are often sealed on to the vial after formation in a separate step. Under certain conditions, that step must be done under aseptic conditions and must ensure a tight, hermetic seal between the cap and the vial The cap includes a circular, flat center portion having a rim extending perpendicularly from the outer edge thereof. The rim is intended to fit over the upper edge of the outer wall of the vial in a sealing manner. A ridge may be formed on the inside of the cap rim to enhance the seal of the cap to the vial.

Applicant developed a concept for attempting to seat the cap onto the vial while the vial is still within the mold. In this way, the heat of the molding process could be utilized to maintain sterility during closing thereby eliminating additional steps and reducing costs and time of production of finished sealed vials. In order to effect sealing in the mold, Applicant designed a mold with several moving parts. A first part of the mold is designed to be separated from a main portion of the mold in order to allow the vial to be closed by the cap and to allow the vial to be ejected from the mold.

While the first part of the mold is separated from the main portion, a second mold part rotates on pivots to transfer the cap from its original position in the mold to a position where it is sealed closed on the vial. Once the cap is positioned on the vial, the second mold part swings back to its original position and the vial with the cap seated thereon is then ejected from the main portion of the mold, preferably by an air poppet located near the sprue gate.

After the second mold part has been returned to its original position, and after the vial has been ejected from the mold, the first part of the mold is returned to the main portion of the mold to await the beginning of a new cycle.

Applicant's initial attempts at producing and using a mold that seals the cap to the vial were not totally satisfactory. A particular problem with the mold for the manufacture of the vials is that occasionally the first part of the mold is returned to the main portion of the mold before the second part of the mold is completely reset. As a result, the first mold part strikes the second part, damaging either or both of the mold parts. The failure of the second mold part to return to its initial position may be caused by the second mold part sticking to the vial cap, or other factors delaying the resetting of the second mold part. Other unidentified causes may also contribute to the two mold parts striking each other.

Another problem with the mold is that gases mixed with the molten plastic are not able to escape from the mold cavity during the injection process. As a result, the gases remain with the plastic and form bubbles or weak spots in the molded vials.

An additional problem with the molds is that elements in the first part of the mold are partially separated by a spring during the ejection of the vial from the mold. Because of the distance the elements are separated, excessive wear causes the spring to fail with an undesirable frequency A further problem with the original mold is that the vial-ejecting poppet does not produce a strong enough burst of air to always eject the vial from the mold.

A further, serious problem with the vials encountered during development of the present invention is that during automated assembly, the vial cap does not always seat itself properly on the vial. If the vial is not properly sealed closed while the vial is still in the mold, sterility is not maintained. In certain situations, the cap or vial is actually damaged during the seating process. In either case, the product is not usable.

Applicant has continued to experiment and develop a fully operational mold and a sealed vial made therein which overcomes the deficiencies of Applicant's prior mold system.

Accordingly, it is an object of the present invention to provide a vial with a cap that is able to be seated easily on the vial while the vial is in the mold.

It is another object of the present invention to provide a mold for the manufacture of vials and vial caps wherein the cap may be seated on the vial by automated means with a high degree of reliability while the vial is in the mold.

It is yet another object of the present invention to provide in a mold for the manufacture of vials and vial caps, an arrangement for preventing one portion of the mold from striking and damaging another portion of the mold.

Still another object of the present invention is to provide a seal arrangement for a vial and vial cap that does not significantly impede the seating of the cap onto the vial.

It is another object of the present invention to provide a mold for the manufacture of vials and vial caps wherein gases released from the molten plastic are able to escape from the mold during the injection process.

It is still another object of the present invention to position the vial-ejecting poppet to maximize the effectiveness of the air emitted therefrom.

Still yet another object of the present invention to alleviate stress on springs contained within the mold.

It is still another object of the present invention to provide a seal arrangement for a vial and vial cap that has a high degree of reliability.

In view of these objects, it was determined that if certain modifications were made to the experimental vial mold, some of which affect the shape of the vial, dramatic increases in product quality and improved mold operation resulted.

Accordingly, in an effort to improve the quality of the vial and to increase the productivity of the mold, certain changes were made. These changes individually and collectively have produced a mold, a process of operating the mold and a sealed vial that are markedly better and more consistent than Applicant's prior efforts. These changes include but are not limited to the following:

A radius was formed in the mold at the region of the top of the vial wall, the effect of the radius being to form a smooth transition between the vial interior wall and the end surface of the vial wall.

The taper of the mold forming the interior of the vial was changed from about ½° to about ¾°.

The tip of the annular seal within the vial cap was rounded with a slight radius.

The intersection between different regions in the interior surface of the vial cap rim has been rounded with a slight break.

Vents have been added to the mold to allow gases trapped within the molten plastic to escape.

The air poppet was rotated 90° so that the air stream emitted therefrom is directed toward the vial.

In accordance with additional preferred embodiments of the present invention, a rack and pinion gear system is used to pivot the second mold part for improved control. Further, a safety switch is used to indicate when the second mold part is reset to avoid unwanted engagement of mold parts. In addition, extensions of a press means are used, instead of springs, to temporarily separate the stripper plate from the end plate.

While these features are illustrative, the various combinations of features that comprise Applicant's invention are set out in the attached claims.

BRIEF DESCRIPTION OF THE DRAWINGS

Preferred embodiments of the present invention will be described in greater detail with reference to the accompanying drawings, wherein like members bear like reference numerals and wherein:

FIG. 1 is side view, in partial cross section of a first preferred embodiment of a mold according to the present invention;

FIG. 2 is a side view of a mold core used in the mold depicted in FIG. 1;

FIG. 3 is a side view of another mold core used in the mold depicted in FIG. 1;

FIG. 4 is an enlarged view, in cross section of a portion of the mold core depicted in FIG. 3;

FIG. 5 is a cross-sectional view of a vial and vial cap according to the present invention;

FIG. 6 is a side view of a flipper arm used in the mold depicted in FIG. 1;

FIG. 7 is a top view of the flipper arm depicted in FIG. 6;

FIG. 8 is a side view of a poppet valve used in the mold depicted in FIG. 1;

FIG. 9 is a side view of a portion of a second preferred embodiment of a mold according to the present invention; and FIG. 10 is a side view of a flipper arm used in the second preferred embodiment of the present invention.

DETAILED DESCRIPTION OF THE PREFERRED EMBODIMENTS

With reference to FIGS. 1 and 5, a first preferred embodiment of a mold 10 according to the present invention is provided for making a vial 12 and cap 14. The vial 12 and cap 14 are preferably injection-molded in the mold 10 from a thermoplastic material. The vial 12 may be integrally connected to the cap 14 by means of a tab or flange 16. Because the interior of the vial 12 is preferably maintained in a sterile condition, the mold 10 is adapted to seat the cap 14 onto the vial 12 in a sealing manner while the vial 12 is still in the mold 10.

With specific reference to FIG. 1, the mold 10 primarily includes a first mold part comprising an end plate or end mold part 18, an intermediate plate 20, and a stripper plate or interior mold part 22, and a second mold part comprising a central portion 26 and a flipper or pivoting arm 28. The second mold part is arranged on a mold frame 24.

The intermediate plate 20 is connected to the end plate 18 by means of bolts or other suitable fastening means (not shown). When the mold 10 is in an original configuration, the stripper plate 22 is arranged between the intermediate plate 20 on one side and the frame 24, the central portion 26, and the flipper arm 28 on its other side.

A press means (not shown) is provided to both hold all three plates 18,20,22 against the frame 24 with pressure during the injection process and to retract the end and intermediate plates 18,20 away from the frame 24 after the vial 12 has been injected. A bolt 30, threadedly engaged with the stripper plate 22 is arranged with its head 32 located within a chamber 34 in the end and intermediate plates 18,20. A shoulder 36 of the chamber 34 is designed to engage the bolt head 32 after the end and intermediate plates 18,20 have travelled about one inch away from the stripper plate 22. The contacting of the bolt head 32 with the shoulder 36 prevents any further separation of the stripper plate 22 from the end and intermediate plates 18,20.

It should be noted that specific dimensions used throughout this specification are exemplary and are only intended to illustrate relative sizes of the various elements and not in any way to limit the present invention to the particular disclosed dimensions or operating parameters.

A cavity 38 is formed within the plates 18,20,22, and a spring 40, such as a red die spring, is arranged within the cavity 38 under compression when the mold 10 is closed. The effect of the spring 40 is to apply a repulsive force between the stripper plate 22 and the end and intermediate plates 18,20.

Accordingly, when the press means is pulling the end and intermediate plates 18,20 away from the frame 24, during the first inch of travel of the plates 18,20, the spring 40 will hold the stripper plate 22 against the frame 24 with a reducing force. After about one inch of travel, the bolt head 32 will contact the chamber shoulder 36, and the stripper plate 22 will then be drawn by the press means away from the frame 24.

If the separation distance between the stripper plate 22 and the intermediate plate 20 is substantially greater than one inch, undesirable stresses are created in the spring 40. These stresses may lead to premature failure of the spring 40.

A rod 42 is fastened within the intermediate plate 20, and extends through an opening 44 in the stripper plate 22 and into a bore 46 located in the frame 24 of the mold 10. The rod 42 maintains the plates 18,20,22 in alignment with each other and with the frame 24 of the mold 10. Preferably, one such rod arrangement is provided in each corner of the mold 10.

With reference now to FIGS. 1 and 2, a first core 48 is mounted within the intermediate plate 20 so as to project through a first opening 50 in the stripper plate 22 and into a recess within the central portion 26 of the mold 10. The first core 48 provides a mold surface for forming the interior wall 60 of the vial 12 during the molding process.

With specific reference to FIG. 2, the first core 48 is preferably about 5.853" in length and has a first end 52 that is adapted to engage with the intermediate plate 20. The second end 54 of the first core 48 is approximately 3.276" in length and comprises the surface that actually forms the interior wall 60 of the vial 12. This second end 64 has a recess 56 at the base thereof to accommodate the influx of molten plastic.

Desirable mold efficiency and vial quality is obtained by providing the second end 54 of the core 48 with a diameter of about 1.097" at its base, and expanding slightly the diameter of the core 48 toward the first end 52 with a taper of about ¾ of a degree. The ¾° taper facilitates withdrawing the core 48 from the vial 12 without inadvertently pulling the vial 12 from the mold 10 prior to seating the cap 14 thereon as will be explained in greater detail below.

At a distance of about 3.276" from the second end 54 there is an abrupt increase in the core diameter from 1.177" to 1.229". At this abrupt increase, a smooth 90° radius 58 of about 0.026" is formed in the core 48.

With reference now to FIG. 5, the radius 58 provides a smooth transition surface having a like radius of about 0.026" from the interior wall 60 of the vial 12 to the upper edge 62 of the vial 12.

Also provided at the top of the vial wall is an annular ridge 63 extending around the periphery of the vial 12. The ridge 63 and the smooth transition surface at the upper edge 62 of the vial form an annular region for interlocking with the cap 14. At the top of the ridge 63 the outer diameter is about 1.248", compared with an outer wall diameter of about 1.225" adjacent the ridge 63. The outer diameter of the ridge 63 is constant for about 0.033" at a first ridge surface 65. Adjacent the first ridge surface 65, a second ridge surface 67 tapers down to the outer wall of the vial 12 over a distance of about 0.030" at a 21° angle.

With reference to FIGS. 1, 3, and 4, a second core 64 is mounted within the intermediate plate 20 so as to project through a second opening 66 in the stripper plate 22. The base 68 of the second core 64 is located adjacent a flipper arm 28.

The base 68 of the second core 64 comprises the mold surface that forms the interior surface 70 of the vial cap 14. With specific reference to FIG. 4, a recess 72 is provided in the base 68 of the second core 64 for forming an annular seal 74 projecting from the interior surface 70 of the vial cap 14.

The seal 74 is provided with an inner edge 75 and an outer edge 77 that are substantially perpendicular to the interior surface 70 of the vial cap 14. An end surface 79 of the seal 74 interconnects the inner edge 75 with the outer edge 77, and intersects the edges with an angle of about 45°. A radius 76 of about 0.003" is provided at the intersection of the end surface 79 and the inner edge 75. A gap 81 having a width of about 0.032" is provided between the annular seal 74 and tee cap rim.

The seal 74, the gap 81 and the cap rim combine to form an annular region for interlocking with the interlocking annular region on the vial. The annular seal 74 is adapted to at least partially fit within the recess formed at the top of the vial wall 60 by the radius 58 of the first core 48. The end surface 79 is angled so as to guide the upper edge 62 of the vial wall into the annular gap 81 formed between the seal 74 and the outer cap rim. The radius 76 forms a smooth transition surface to further guide the seal 74 around the vial wall.

With continued reference to FIG. 4, at the base 68 of the second core 64 is a cylindrical section 78 that extends from the base end for about 0.025", at which point, the core wall tapers inward at an angle of about 21°. At the intersection 80 of the cylindrical section 78 and the tapered section 82, a smooth radius of about 0.005" is formed.

Turning attention now to FIG. 5, the cap 14 has a surface 85 formed by the cylindrical section 78 of the core 64, and a conically tapered wall section 87 formed by the tapered section 82 of the core 64. The radius at intersection 80 of the core 64 forms a like radius 84 intersecting the surface 85 and the wall section 87. The gap 81 is thus bounded by the outer wall 77 of the seal 74 and the wall surfaces 85,87 of the cap rim.

The annular ridge 63 of the vial 12 is designed to fit within the gap 81, with the 21° tapered surface 67 of the ridge 63 nesting with the 21° tapered surface 87 of the cap rim.

With reference now to FIG. 1, the central portion 26 of the mold 10 fits within a recess in the frame 24. The central portion 26 has a substantially cylindrical recess, the wall of which provides a surface for forming the outer wall of the vial 12. Annular water channels 116 extend around an outer periphery thereof through which channels 116 water is circulated to facilitate cooling during the molding process. O-rings 120 are provided adjacent the channels 116 to maintain a seal around them.

The end plate 18 has a water channel 104 extending therethrough. The water channel 104 interconnects with water channels 106,108 extending longitudinally through the first and second cores 48,64, respectively. O-rings 110,112 are positioned adjacent the interconnection of the water channels 106,108 of the cores 48,64 and the water channel 104 of the end plate 18 in order to enhance the seal therebetween. The water channels 104,106,108 facilitate cooling during the molding process.

With reference now to FIGS. 1, 6 and 7, a flipper arm 28 is arranged adjacent the stripper plate 22, the base 68 of the second core 64, the central portion 26 of the mold 10, and the frame 24 of the mold 10. The flipper arm 28 has pivot pins 86 on opposite sides thereof to permit pivoting of the flipper arm 28 within the frame 24 of the mold 10 when the plates 18,20,22 are separated therefrom. A surface 88 of the flipper arm 28 forms the outside surface 90 of the vial cap 14 during the molding process.

With specific reference to FIGS. 6 and 7, shallow air vents 89 are provided in the flipper arm 28. The vents 89 interconnect the mold surface 88 to outside of the flipper arm 28 in order to allow gases trapped within the molten plastic to escape from the mold during the injection process. The vents 89 are preferably shallow, e.g., about 0.038" deep.

Without the vents 89 to release the gases, the trapped gases would form bubbles in the vial 12 and cap 14. This is particularly problematic if bubbles form in the seal 74 or other areas functionally related to the sealing of the cap 14 onto the vial 12.

With reference to FIGS. 6 and 7, a slot 92 is provided in at least one of the pivot pins 86, and a rectangular plate 94 is mounted within the slot such that at least one end of the plate 94 extends beyond the pin 86. Controlled air jets (not shown) are provided with the mold 10 to act on the surfaces of the plate 94 projecting from the pin 86 so as to pivot the flipper arm 28. The jets can be arranged so as to selectively act on either side of the plate 94.

Located within the frame 24 of the mold 10 adjacent the base of the first core 48 is a sprue gate 96 through which molten plastic is injected into the mold 10. The diameter of the sprue gate 96 is preferably about 0.060", and is chosen to allow the plastic to be injected into the mold 10 at as rapid a rate as reasonably possible. The air vents 89 facilitate the rapid injection of plastic by allowing air present in the mold 10 to escape while the plastic is being injected.

With reference to FIGS. 1 and 8, also located within the frame 24 of the mold 10 adjacent the base of the first core 48 is an air poppet 98 that is used to eject the cooled and sealed vial 12 from the mold 10. The air poppet 98 has an air channel 100 extending longitudinally therethrough. Within the air poppet 98, at the end positioned near the first core 48, is a second air channel 102 extending perpendicularly to the air channel 100. The second air channel 102 is arranged so as to receive a current of air from the channel 100 and direct it against the vial 12 in order to eject the vial 12 from the mold 10.

On the exterior surface of the air poppet 98 are two O-ring grooves 99, with O-rings 101 provided therein. The O-rings 101 provide baffles which coact with compressed air delivered through channel 104 to longitudinally move the poppet 98 within its chamber 103 provided in the frame 24 of the mold 10.

When the vial 12 is ready to be ejected from the mold, a jet of air from the air channel 104 drives the air poppet 98 through its housing until it contacts the vial 12 and pushes it from the mold 10. When the air poppet 98 is projected into the mold cavity, air currents from the air channel 102 then further help to eject the vial 12. The air poppet 98 is provided with angled surface 105 that will contact the vial 12 in a flat manner so as not to mark the vial 12.

In operation of the mold 10, the end, intermediate and stripper plates 18,20,22 are held against the frame 24 of the mold 10 with about fifteen tons of pressure by a press means (not shown).

With the plates 18,20,22 in position against the frame 24, a cavity 114 is formed with the third plate 22 and the first and second cores 48,64 defining one side thereof and the flipper arm 28, the central portion 26 and the frame 24 defining the other side. Into this cavity 114, molten plastic is injected through the sprue gate 96 with about fifteen tons of pressure so as to form the vial 12 and cap 14. In an illustrative, preferred embodiment, the injected vial 12 and cap 14 are allowed to cool for about six seconds while the temperature thereof drops from about 550° F. to about 100°-120° F. The specific temperature to which the vial 12 is reduced may vary with the size and type of vial but should be cool enough so that the plastic is actually set, and hot enough to maintain sterility.

Water is circulated through the water channels 104,106, 108,116 of the mold 10 in order to accelerate the cooling of the vial 12 and the cap 14.

When the vial 12 and the cap 14 are sufficiently cooled, the end plate 18 and the intermediate plate 20 are withdrawn from the frame 24 of the mold 10. As described above, as the end and intermediate plates 18,20 initially move away from the frame 24, the spring 40 acts between the stripper plate 22 and the end plate 18 to hold the stripper plate 22 against the frame 24. After the end and intermediate plates 18,20 have separated from the stripper plate 22 by about one inch, the head 32 of the bolt 30 engages with the shoulder 36 of the chamber 34 within the end and intermediate plates 18,20 and pulls the stripper plate 22 away from the frame 24. The rods 42 are guided within their respective openings 44 and bores 46 to maintain the three plates 18,20,22 in alignment with the frame 24 during the separation of the plates 18,20,22 from the frame 24.

The first and second cores 48,64 being attached to the intermediate plate 20, move away from the frame 24 together with the plates 18,20,22.

When the base of the first core 48 is about three inches from the frame 24, the flipper arm 28 is pivoted so as to bend the flange 16 interconnecting the vial 12 and the cap 14 and to seat the cap 14 onto the vial 12 while the vial 12 remains within the central portion 26 of the mold 10. After the cap 14 has been properly seated on the vial 12, the flipper arm 28 is then returned to its original position in the mold 10.

When the cap 14 is being seated on the vial 12, the radius 76 formed on the end of the annular seal 74, together with the end surface 79 of the seal 74 facilitates the guiding of the cap 14 onto the vial 12. Also facilitating the seating of the cap 14 is the smooth transition surface at the end of the vial wall formed by radius 58 on the core 48.

After the seal 74 has been guided within the vial 12, the annular ridge 63 fits within the gap 81, adjacent the wall section 85. The angled surface 87 nests against the angled surface 67 of the annular ridge 63 and helps prevent the cap 14 from inadvertently becoming unseated from the vial 12.

As explained above, the air poppet 98 together with a burst of air injected through channels 100,102 in the air poppet 98 pushes the vial 12 and cap 14 out of the mold 10. When the vial 12 and cap 14 have been ejected, the plates 18,20,22 are returned to the mold by the press means, and additional plastic is injected into the mold to repeat the cycle.

Although the dimensions of the mold 10 and vial 12 may be varied according to need and the principles of the present invention, in the first preferred embodiment, the vial 12 is about 3.272" in height with an internal diameter ranging from 1.160" at the top to 1.081" at the base. The stripper and intermediate plates 22,20 are each about 1.375" thick and have outside rectangular dimensions of 6.5"×9.875", while the end plate 18 is about 1.375" thick and has outside dimensions of 8"×9.875". The frame 24 is about 5.75" thick with approximate outside rectangular dimensions of 8"×9.875".

With reference to FIG. 9, a second preferred embodiment of the present invention is provided with an end plate 118, an intermediate plate 120, and a stripper plate 122, which are arranged adjacent one another in a manner similar to the arrangement of the plates 18,20,22 of the first preferred embodiment. The plates 118,120,122 do not have a spring arranged between them. Instead, through-bores 124,126 extend through the end and intermediate plates 118,120. When the press means 150 engages the end plate 118 with arms 152 and is retracting it from the frame of the mold, retractable projections 128,130 associated with the press means extend through the through-bores 124,126 and press the stripper plate 122 against the mold frame for a predetermined period until an arrangement, such as bolt 30 disclosed in the first preferred embodiment, engages the stripper plate 122 and retracts it away from the frame together with the end and intermediate plates 118,120.

With reference to FIG. 10, in the second preferred embodiment, a rack and pinion arrangement is provided to selectively rotate a flipper arm 128 about pivot pins 186. The pins 186 of the flipper arm 128 extend through openings in the mold frame and are mounted in bearings 132 attached to the exterior of the mold. On one pin 186 is fixed a pinion 134. A rack 136 is engaged with the pinion 134 and mounted on the mold frame so as to be driven in an oscillatory manner. Movement of the rack 136 against the pinion 134 causes the flipper arm 128 to pivot about the pins 186.

On the other pin 186 is fixed an eccentric cam 138. A microswitch 140 is mounted on the mold frame with a pin 142 adjacent the cam 138. The cam 138 and pin 142 are oriented such that when the flipper arm 128 is reset to its original configuration, i.e., out of the way of the plates 118,120,122, the microswitch 140 emits a signal that enables activation of the press means. Until the cam 138 initiates such a signal, the press means will not return the plates 118,120,122 to the mold. Accordingly, the positive drive of the rack and pinion 134,136 and the cam 138 and microswitch 140 act to prevent the plates 118,120,122 from closing and thus inadvertently striking the flipper arm 128 before the flipper arm 128 is completely reset.

In all other respects, the second preferred embodiment operates in the same manner, and is constructed in accordance with the first preferred embodiment. Furthermore, it should be readily apparent to one of ordinary skill in the art that any of the inventive features of the second preferred embodiment can be incorporated on the first preferred embodiment.

As a result of the improved vial, mold, and processes described according to the preferred embodiments, the manufacture of the vials has improved to the extent that the rejection rate of the vials has declined to below about 10% (or lower) from a rejection rate of about 50% before the improvements were made. In operation, the rejection rate has been consistently less than 5% and has been even less than 2% for extended production runs of several hundred thousand vials. This reduction in the rejection rate is in part attributable to the fact that the seals have better integrity and therefore the cap tends to seal easier and remain seated on the vial. This has improved the acceptance rate, because if the cap becomes unseated, the sterility of the vial is lost and the vial can no longer be used. In addition, the mold parts are no longer striking and damaging each other, particularly as a result of the positive drive employed on the flipper arm and the microswitch to sense the position of the flipper arm.

The principles, preferred embodiments and modes of operation of the present invention have been described in the foregoing specification. The invention that is intended to be protected herein should not, however, be construed as limited to the particular forms disclosed, as these are to be regarded as illustrative rather than restrictive. Variations and changes may be made by others without departing from the spirit of the present invention. Accordingly, the foregoing detailed description should be considered exemplary in nature and not limited to the scope and spirit of the invention as set forth in the attached claims.

What is claimed is:

1. A process for forming an aseptic vial with a cap, comprising the steps of:
    injecting a molten material into a mold cavity defined on one side by an end mold part and an interior mold part and on the other side by a second mold part wherein said interior mold part is in contact with said second mold part;
    forming from the molten material a vial and cap with annular regions for interlocking with one another, said regions including rounded transition surfaces for accommodating each other, wherein portions of the vial and cap are formed between the interior mold part and the second mold part and between the end mold part and the interior and second mold parts;
    venting from the mold cavity gases that are released from the molten plastic during the injecting step;
    cooling the vial and cap to about 100°–120° F.;
    maintaining the interior of the vial in an aseptic condition within the mold;
    retracting the end mold part from the interior mold part to separate the end mold part from the vial and cap;
    pressing the interior mold part directly against the second mold part while retracting the end mold part from the interior mold part and the vial and cap to retain the vial and cap within the second mold part by holding said portions of the vial and cap between the second mold part and the interior mold part while the second mold part is in direct contact with the interior mold part;
    retracting the interior mold part from the second mold part and the vial and cap;
    sealing the cap on the vial by pivoting a pivotable mold part from an original position to a sealing position and back to the original position, so as to guide, by means of the rounded transition surfaces, the annular regions of the vial and cap for interlocking with one another;
    sensing when the pivotable mold part is in an original position;
    ejecting the vial from the mold; and
    returning the end and interior mold parts to the second mold part when the pivotable mold part is in the original position.

2. The process of claim 1, wherein the cap is sealed on the vial when the vial interior is in an aseptic condition.

3. A process for forming an aseptic vial with a cap, comprising the steps of:
    defining a mold cavity between an end mold part and an interior mold part on one side and a second mold part on the other side, wherein said interior mold part and said second mold part are in direct contact with each other;
    injecting a molten material into the mold cavity thereby forming from the molten material a vial and cap, said vial having an annular region at the top edge thereof for interlocking with an annular region at the interior periphery of said cap, said regions including rounded transition surfaces for accommodating each other, wherein portions of the vial and cap are formed between the interior mold part and the second mold part, and between the end mold part and the interior and second mold parts;

retracting the end mold part from the interior mold part to separate the end mold part from the vial and cap while applying a biasing force from the end mold part against the interior mold part so as to bias the interior mold part against the rest of the mold to retain the vial and cap within the second mold part by holding said portions of the vial and cap between the second mold part and the interior mold part while the second mold part is in direct contact with the interior mold part;

limiting the distance that the end mold part is separated from the interior mold part;

retracting the interior mold part from the second mold part when the end mold part has been retracted a predetermined distance from the interior mold part;

pivoting a pivoting mold part to move the cap with respect to the vial so as to guide, by means of the rounded transition surfaces, the interlocking annular region of the cap onto the corresponding interlocking annular region of the vial so as to seal the cap on the vial while maintaining the interior of the vial in an aseptic condition and while the end and interior mold parts are retracted from the rest of the mold; and ejecting the vial from the mold.

4. A process for forming an aseptic vial with a cap, comprising the steps of:

defining a mold cavity between an end mold part and an interior mold part on one side and a second mold part on the other side, wherein said interior mold part and said second mold part are in direct contact with each other;

injecting a molten material into the mold cavity thereby forming from the molten material a vial and a cap, said vial having a smooth transition surface at an annular region at a top edge thereof for interlocking with an annular region at an interior periphery of said cap, said smooth transition surface including a radius for accommodating a corresponding region of the cap, wherein portions of the vial and cap are formed between the interior mold part and the second mold part, and between the end mold part and the interior and second mold parts;

engaging the end mold part with means for retracting the end mold part;

pressing the interior mold part against the second mold part with the retracting means to retain the cap and vial within the second mold part by holding said portions of the vial and cap between the second mold part and the interior mold part while the second mold part is in direct contact with the interior mold part while retracting the end mold part from the interior mold part, thus separating the end mold part from the cap and vial;

retracting the interior mold part away from the second mold part and the cap and vial;

pivoting a pivoting mold part to move the cap with respect to the vial so as to guide, by means of the rounded transition surface, the interlocking annular region of the cap onto the corresponding interlocking annular region of the vial while maintaining the interior of the vial in an aseptic condition and while the end and interior parts of the mold are separated from the second part of the mold; and ejecting the vial from the mold.

5. The process of claim 4, wherein the sealing step includes pivoting a pivotable part of the mold to place the cap onto the vial and then repivoting the pivotable part to its original configuration.

6. The process of claim 5, further including the step of providing a signal for enabling movement of the end and interior mold parts only when the pivotable part is in its original configuration.

7. The process of claim 5, wherein the pivotable part is pivoted by a rack and pinion.

8. The process of claim 4, wherein the step of ejecting the vial from the mold includes pushing the vial from the mold with an air poppet and air currents.

9. The process of claim 4, wherein the step of pressing the interior part against the second part of the mold includes contacting the interior part with retractable projections on the engaging means.

10. The process of claim 4, further comprising the steps of:

sensing the position of the pivoting mold part;

determining when the second mold part has been returned to its original configuration; and initiating the return of the first mold part after the second mold part is in its original configuration.

11. The process of claim 4, further comprising the step of using a rack and pinion system to pivot the pivoting mold part.

12. The process of claim 4, further comprising the step of venting trapped gases from the mold cavity.

* * * * *